Figure 1:

United States Patent [19]

Roeder et al.

[11] B 3,923,680

[45] Dec. 2, 1975

[54] AGGLOMERATED RUBBER CHEMICALS

[75] Inventors: Henning Roeder; Günter P. Langner, both of Leichlingen; Bernd Scherhag, Leverkusen; Hans-Lothar Nickenig, Leverkusen-Steinbuechel, all of Germany; René Loix, Leuven-Heverlee, Belgium

[73] Assignee: Bayer Aktiengesellschaft, Germany

[22] Filed: Aug. 31, 1972

[21] Appl. No.: 285,200

[44] Published under the Trial Voluntary Protest Program on January 28, 1975 as document no. B 285,200.

[30] Foreign Application Priority Data

Sept. 4, 1971 Germany............................ 2144378

[52] U.S. Cl. ............ 252/182; 159/DIG. 10; 159/48; 264/13; 264/117; 252/184; 428/357
[51] Int. Cl.². .......................................... E09K 3/00
[58] Field of Search ............... 161/168; 264/13, 117; 252/182, 184; 260/752; 159/DIG. 10, 48; 426/285; 23/313; 428/357

[56] References Cited

UNITED STATES PATENTS

| 3,042,526 | 7/1962 | Spiess et al. ......................... 426/285 |
| 3,387,923 | 6/1968 | Shen ................................. 23/313 X |
| 3,447,962 | 6/1969 | Megowen............................ 23/313 X |
| 3,516,902 | 6/1970 | Bonneav ............................. 161/168 |
| 3,645,765 | 2/1972 | Frazier et al..................... 264/117 X |
| 3,647,704 | 3/1972 | Schrantz ............................. 252/182 |
| 3,705,019 | 12/1972 | Mesiah et al. .................. 264/117 X |

Primary Examiner—George F. Lesmes
Assistant Examiner—R. J. Roche
Attorney, Agent, or Firm—Connolly and Hutz

[57] ABSTRACT

Object of the invention are granulates (agglomerates) of rubber chemicals having an average particle diameter of greater than 60 $\mu$ and a process of their production, wherein a binder-free suspension is sprayed into a hot gas stream with an inlet temperature from about 150° to 350°C and an outlet temperature below 120°C. Agglomerated particles having a moisture content of less than 1 percent by weight and an average grain size of greater than about 60 $\mu$ are thus produced.

1 Claim, 2 Drawing Figures

AGGLOMERATED RUBBER CHEMICALS

This invention relates to fine dry granulates of rubber chemicals which show outstanding stability during transportation coupled with ready workability, and to a process for producing these fine granulates.

It is known that, in addition to fillers such as carbon black or silica gel, a number of other additives are incorporated during the vulcanisation of rubber in order to influence either the process of vulcanisation itself or the properties of the resulting vulcanisate.

Additives of this kind include, for example, vulcanisation accelerators or retarders, stabilisers or antiagers or masticating and regenerating agents. Such additives are normally added to the batches in relatively small quantities, normally in quantities of from 0.1 to 2.0 percent by weight, based on the rubber content, and enable the resulting vulcanisate to show the required properties. It is necessary to adhere strictly to a recipe, and also all the components have to be mixed together as homogeneously as possible so that the form in which the substances are added to the rubber mixtures plays an important part. It is clear that additives in a form as finely powdered as possible shorten the mixing times with the result that smaller mixing apparatus and less energy are required. Thus, a grain fineness of on average from 5 to 10 $\mu$ is required for rubber chemicals which do not fuse during the mixing operation, grain sizes of more than about 60 $\mu$ having to be confined to less than 0.5 percent by weight. The result of this is that, when the substances are worked in dust is evolved in considerable quantities and, on account of their non free-flowing or free-running form, these substances are totally unsuitable for automatic metering apparatus. The dust itself is hygienically undesirable because it generally consists of sulphur- and nitrogen-containing compounds having an amine or mercaptan character, and thus constitutes a very serious pollution problem to personnel.

Accordingly, various attempts have been made to use the rubber chemicals in granulate form. However, in order to obtain stable granulates with modern drum-type granulating machines, it is generally necessary to add binders if the relatively large granulates are to withstand transportation without disintegrating. However, if they are so hard that, before use, they have not disintegrated into the mixture, their incorporation is generally attended by difficulties such as speckling or splitting of the granulates on cylinder mixers.

The result of these difficulties has been that the granulates have not produced any real advance in vulcanisation technology; the expensive production of granulates being another reason. Accordingly, attempts have been made to lessen the pollution caused by dust by adding a layer of paraffin oil to the powder to make it tacky. The products substantially deprived of their dust content in this way are unfortunately no longer free-flowing which naturally makes them impossible to use in automatic metering installations designed for free-flowing materials. Added to this is the fact that, on account of new scientific knowledge, the vulcanisation accelerators or retarders and anti-oxidants acting in the same way as catalysts or stabilisers are having to meet increasingly more stringent purity requirements which ultimately prohibit the production of granulates with binders added to them.

The object of the invention was to produce dry fine granulates of rubber chemicals from suspensions, more particularly from aqueous suspensions, which granulates are stable during transportation and which, under transportation conditions, are resistant to abrasion, substantially dust-free, free-flowing and dispensable and which can readily be mixed into the rubber compositions.

This object was achieved by starting from suspensions, preferably aqueous suspensions, of the rubber chemicals, the particle size (grain size) being on average less than 60 $\mu$, and agglomerating by a combination of special conditions the original particles essentially present in non-spherical form to form particles with an average particle diameter of greater than 60 $\mu$. It is possible in this way to obtain agglomerates of substantially spherical configuration having surfaces which remain resistant to abrasion and smooth under transportation conditions. In addition, the agglomerates have the fine texture of the original particles. Only when they are worked into the rubber compositions do the agglomerates disintegrate into particles with the original fine texture.

The particles (agglomerates) according to the invention, also referred to hereinafter as fine or micro-granulates, have the required ready workability, coupled with an outstanding stability during transportation. They show outstanding free-flow properties without the phenomenon of bridge formation and, hence, they are eminently suitable for use in automatic mixing and dispensing machines.

Accordingly, the invention relates to a process for the production of spherical, abrasion-resistant, smooth-surface fine granulates of defined particle size by agglomeration, wherein a binder-free suspension of a rubber chemical having a purity of greater than 95 percent and an average grain size of less than 60 $\mu$ with a solids content of from about 5 to 60 percent by weight, a viscosity of from 0.5 to 100 cP at 20° C., is sprayed through a single-component or multiple-component nozzle or through a rotating disc atomiser into a hot gas stream with an inlet temperature of from about 150° to 350° C. and an outlet temperature below 120° C., and wherein the agglomerated particles with a moisture content of less than 1 percent by weight and an average grain size of greater than about 60 $\mu$ are isolated and the particles with an average grain size of less than about 60 $\mu$ are returned to the agglomeration process.

The invention also relates to the fine granulates (agglomerates) thus produced with an average particle diameter of greater than 60 $\mu$.

The process according to the invention is preferably carried out in aqueous suspension.

In the context of this invention, rubber chemicals are for example vulcanisation accelerators, vulcanisation retarders, antiagers, antiozonants, masticating agents and regenerating agents.

The rubber chemicals used in the process according to the invention must be highly pure (i.e., purity in excess of 95 percent) so that the individual granulates do not stick to one another or cake on those parts of the apparatus with which they come into contact during the agglomeration process. The degree of purity is preferably in excess of 98 percent.

The suspensions can have solids contents of from 5 to 60 percent by weight and preferably from 25 to 45 percent by weight.

In order to adjust the viscosity of the suspensions during spraying and also to prevent the electrical charges which can be developed by different materials on account of their sulphur content, surface-active agents which should not have any binding effect can be added to the suspensions in quantities of from 0.1 to 4 percent by weight and preferably in quantities of from 0.3 to 1 percent by weight, based on the solids content. The suspensions should have viscosities of from 0.5 to 100 cP and preferably from 1 to 40 cP, as measured at 20° C.

The agglomeration process can be carried out by spraying the suspensions of the rubber chemicals in a spray dryer through a single-component nozzle under pressure (5 to 80 atms.) or a multiple-component nozzle or a rotating disc atomiser into a hot gas stream, for example of air or nitrogen. The hot gas stream has inlet temperatures of from 150° to 350° C. and outlet temperatures of less than 120° C.

The dry product with a residual moisture content of less than 1 percent by weight, preferably from 0.1 to 0.5 percent by weight, accumulates in the form of two component streams of which one can make up as much as 95 percent by weight of the total and consists essentially of dust-free, smooth spherical particles with an average diameter of from 60 to 500 $\mu$, preferably from 100 to 300 $\mu$. The second component stream (up to about 40 percent by weight of the total) consists of particles with an average grain size of less than 60 $\mu$ and is returned to the agglomeration process in the form of a suspension.

The agglomerates obtained in accordance with the invention can consist of a single material, although they can also consist of mixtures of several rubber chemicals. In this case, mixing can be carried out either before agglomeration or on completion of agglomeration.

Figure 2:
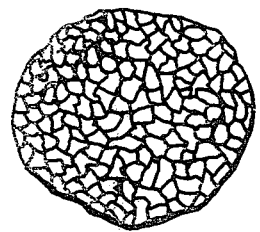

FIG. 1 shows non-agglomerated primary particles of the rubber chemicals with a particle size of less than 60 $\mu$. FIG. 2 is a section through a substantially spherical agglomerate particle of the rubber chemicals with an average grain size of around 300 $\mu$ which has the fine texture of the primary particles.

The following are mentioned as examples of materials for agglomeration from aqueous suspension: 2-mercapto benzothiazole and 2-mercapto benzimidazole, their zinc salts, dibenzothiazyl disulphide, the sulphenamides formed from 2-mercaptobenzothiazole and amines such as, for example, tert.-butyl, cyclohexyl, dicyclohexyl, morpholyl sulphenamides and mixtures thereof or diaryl guanidines or dithiocarbamic acid derivatives such as the zinc salts of dimethyl, diethyl, ethylphenyl, piperidyl, dithiocarbamic acid or thiurams for example tetramethyl thiuram disulphide, tetramethyl thiuram monosulphide, dimethyl diphenyl thiuram disulphide, tetraethyl thiuram disulphide or thiourea derivatives such as diaryl thiourea or ethylene thiourea (2-mercapto imidazoline), or the zinc salts of pentachlorothiophenol, o-phthalic acid anhydride, benzoic acid.

This list can be continued ad infinitum and does not by any means represent a limitation of the process according to the invention.

The following Examples illustrate one possible embodiment of the process, although they are by no means intended to limit the process in any way.

EXAMPLE 1

In a spray dryer 1.90 metres in diameter and 5 metres tall, an aqueous suspension of a 2-mercapto benzthiazole (98.2 percent pure with a solids content of 25 percent by weight, a viscosity of 3.8 cP at 20° C. and a grain fineness of 99.5 percent of the particles smaller than 60 $\mu$) was continuously sprayed under a pressure of 15 atms. through a single-component nozzle with a 0.8 mm bore diameter into a hot air stream with an inlet temperature of 175° C. and an outlet temperature of 91° C.

The dry product accumulated in two separate component streams of which one made up substantially 60 percent by weight of the total and consisted of dust-free, smooth spherical particles with an average grain size of 60 to 180 $\mu$. The other component stream, approximately 40 percent by weight, consisted of a dust which was smaller than 60 $\mu$ and, following conversion into an aqueous suspension, was returned to the agglomeration process. The dry material had a residual moisture content of less than 0.5 percent by weight.

A miscibility test conducted with the material from the first component stream into an extremely soft rubber mixture with a Defo value of 1,000 produced satisfactory, speckle-free incorporation.

EXAMPLE 2

In the same spray dryer as described in Example 1, an aqueous suspension of zinc-bis-2-mercaptobenzothiazole with a purity of 99 percent, a solids content of around 23.8 percent by weight and a grain fineness of 99.5 percent of the particles smaller than 60 $\mu$, which was adjusted by the addition of 3 percent by weight, based on the solids content, of a cellulose sulphonate to a viscosity of around 3.2 cP at 20° C., was continuously sprayed under a pressure of 16 atms. through a singlecomponent nozzle with a 0.8 mm bore diameter into a hot gas stream with an inlet temperature of substantially 275° C. and an outlet temperature of 101° C.

The dry product accumulated in two separate component streams of which one made up 65 percent by weight of the total and consisted of dust-free, smooth spherical particles with a grain size of from 60 to 350 $\mu$, whilst the other made up 35 percent by weight of the total and consisted of a dust which was smaller than 60 $\mu$. The dry product had a residual moisture content of less than 0.5 percent by weight.

A miscibility test carried out with the material of the first component stream into a very soft rubber mixture with a Defo value of 1000 produced satisfactory, speckle-free incorporation.

EXAMPLE 3

An aqueous suspension of dibenzothiazyl disulphide with a solids content of 35 percent and a grain fineness of 99.5 percent of the particles smaller than 60 $\mu$ was continuously sprayed under a pressure of 25 atms. through a single-component nozzle with a 0.7 mm diameter bore into a hot air stream with an inlet temperature of 275° C. in the spray dryer described in Example 1. The outlet temperature of the air stream was 110° C.

The dry product accumulated in the form of two separate component streams of which one made up 72 percent by weight of the total and consisted of dust-free, smooth spherical particles with a grain size of from 60 to 240 $\mu$, whilst the other component stream made up 28 percent by weight and consisted of a dust which was smaller than 60 $\mu$. The dry product had a residual moisture content of less than 0.5 percent by weight.

A miscibility test carried out with the material of the first component stream into a rubber mixture with a Defo value of 1,000 produced satisfactory, speckle-free incorporation.

EXAMPLE 4

In the spray dryer described in Example 1, an aqueous suspension of 2-mercaptobenzimidazole with a solids content of 28 percent and a grain fineness of 99.5 percent of the particles smaller than 30 μ was continuously sprayed under a pressure of 25 atms. through a single-component nozzle with a 0.7 mm diameter bore into a hot air stream with an inlet temperature of 325° C. and an outlet temperature of 119° C.

The dry product accumulated in the form of two separate component streams, one of which made up 68 percent by weight and consisted of dust-free, smooth spherical particles with a grain size of from 60 to 240 μ, whilst the other component stream made up 32 percent by weight and consisted of a dust which was smaller than 60 μ. The dry product had a residual moisture content of less than 0.5 percent by weight.

A miscibility test carried out with the material of the first component stream into a rubber mixture with a Defo value of 1,000 produced satisfactory speckle-free incorporation.

EXAMPLE 5

In the spray dryer described in Example 1, an aqueous suspension of benzothiazyl cyclohexyl sulphenamide with a solids content of 40 percent and a grain fineness of 99.5 percent of the particles smaller than 60 μ was continuously sprayed under a pressure of 15 atms. through a single-component nozzle with a 0.8 mm diameter bore into a hot air stream with an inlet temperature of 2,000° C. and an outlet temperature of 70° C.

The dry product accumulated in the form of two separate component streams, one of which made up 70 percent by weight of the total and consisted of dust-free, smooth spherical particles with a grain size of from 60 to 240 μ whilst the other component stream made up 30 percent by weight and consisted of a dust which was smaller than 60 μ. The dry product had a residual moisture content of less than 0.5 percent by weight.

A miscibility test carried out with the material of the first component stream into a rubber mixture with a Defo value of 1,000 produced satisfactory, speckle-free incorporation.

What we claim is:

1. A free-flowing, binder-free solid rubber chemical in the form of a smooth surfaced spherical agglomerate of individual particles, said rubber chemical being at least one member selected from the group consisting of vulcanization accelerators, vulcanization retarders, antiagers, antiozonants, masticating agents, regenerating agents and mixtures thereof, said agglomerate of individual particles being produced by the agglomeration process of atomizing a binder-free suspension of at least one of said rubber chemicals having a purity of greater than 95 percent and an average diameter of less than 60 μ with a solids content of from 5 to 60 percent by weight and a viscosity of from 0.5 to 100 cP at 20° C. into a hot gas stream which has an inlet temperature of from 150° to 350° C. and an outlet temperature below 120° C., recovering and returning particles with an average diameter of less than about 60 μ to the agglomeration process and recovering resulting agglomerated particles with a moisture content of less than 1 percent by weight and an average diameter from about 60 μ to 500 μ.

\* \* \* \* \*